March 17, 1942. W. L. CHURCH 2,276,929
VALVE ASSEMBLY
Filed May 21, 1940

Inventor
WALTER L. CHURCH

By E. V. Hardway,
Attorney

Patented Mar. 17, 1942

2,276,929

UNITED STATES PATENT OFFICE 2,276,929

VALVE ASSEMBLY

Walter L. Church, Houston, Tex., assignor of one-half to William K. Holleron, Victoria County, Tex.

Application May 21, 1940, Serial No. 336,317

2 Claims. (Cl. 251—101)

This invention relates to a valve assembly.

An object of the invention is to provide a valve assembly for controlling the flow of liquid and including novel means for lubricating the valve to the end that it may be easily turned to open or closed position.

It is common practice in a valve of this general type to provide external grooves in the valve for the lubricant but which has been found in practice that these grooves or channels soon become filled with sand or other foreign matter to such an extent that the lubricant cannot flow along the grooves and accordingly the lubricating system becomes ineffective.

It is one of the main objects of the present invention to provide lubricating channels in the valve casing with ports leading from said channels to the inner wall, or seat, of the casing through which the lubricant may be fed to said seat, and the valve therein, approximately throughout the length of the valve.

It is another object of the invention to provide, in a valve assembly, a unitary valve which is inherently yieldable to the end that the valve will at all times be in close, but yielding, contact with the valve seat and the wear will be automatically taken up.

With the above and other objects in view the invention has particular relation to certain novel features of construction, operation and arrangement of parts, an example of which is given in this specification and illustrated in the accompanying drawing, wherein.

Figure 3:
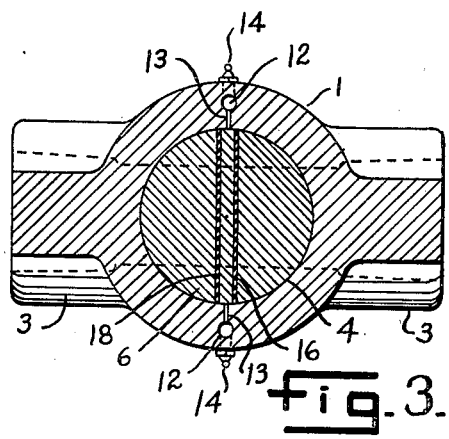
Figure 3 shows a cross-sectional view taken on the line 3—3 of Figure 2.

Referring now more particularly to the drawing wherein like numerals of reference designate the same parts in each of the figures, the numeral 1 designates a valve casing having a flowway therethrough and pipe connections 3, 3 aligned with the flowway, the casing has an approximately cylindrical bore perpendicular to the flowway 2 and forming a valve seat 4. The bore is closed at one end and at the opposite side of the casing there is the cap 5 which may be bolted or otherwise secured to the casing.

Figure 1:
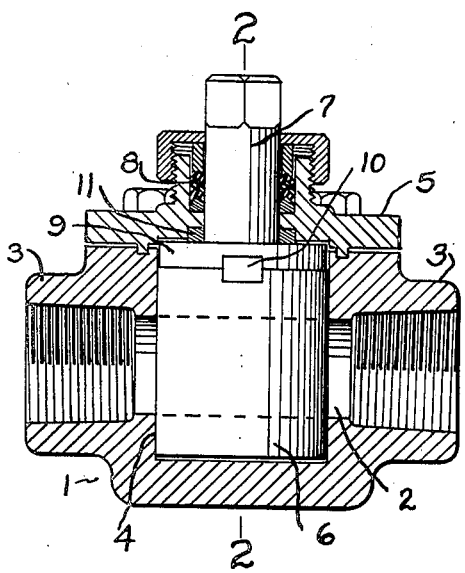
Figure 1 shows a longitudinal, sectional view of the assembly.

Fitted snugly in the seat 4 there is an approximately cylindrical valve 6 which has a transverse bore 7 therethrough which may be moved into and out of alignment with the flowway 2 by appropriate turning movements of the valve. The valve may be turned by the stem 7 which extends axially through the cap 5 and is surrounded by a suitable stuffing box 8 carried by said cap. Fixed to the inner end of the stem 7 there is a head 9 which abuts the corresponding end of the valve and which has a splined connection with the valve by means of the transverse spline 10 which is seated in registering keyways in the head and valve as clearly illustrated in Figures 1 and 2.

The outer end of the stem 7 may be made polygonal to receive a wrench by means of which the stem and valve are turned.

A seal ring 11 is fitted closely around the stem in abutting relation with the head and countersunk into the cap 5.

Figure 2:
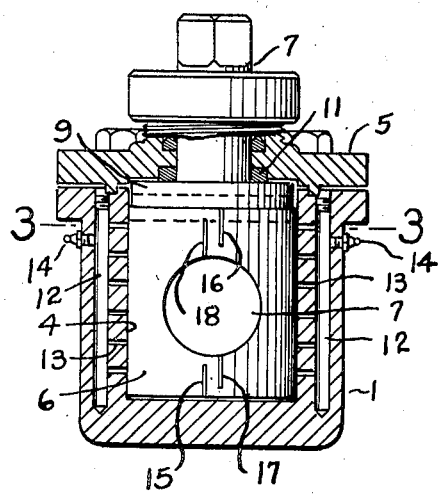
Figure 2 shows a cross-sectional view taken on the line 2—2 of Figure 1.

As clearly illustrated in Figures 2 and 3 the casing has the channels 12, 12 approximately parallel with the valve and in the form of bores within the casing walls and leading from these channels to the seat 4 are the ducts, or ports, 13 extending along said channels approximately from end to end of the valve. Connected into each channel, or bore, 12 there is a grease gun connection 14 through which the lubricant may be forced into the corresponding channel under sufficient pressure to cause the lubricant to feed onto the surface of the valve and as the valve is turned the lubricant will be also fed onto the seat. The lubricant may be replenished from time to time to maintain the required pressure. A very efficient lubricating system is thus provided and inasmuch as the channels 12 and ducts, or ports, 13 are completely closed sand and grit or other clogging matter will be completely excluded so that the system will not be liable to become clogged.

It is desirable that the valve be formed yieldable so that it will at all times be in yielding contact with the seat to form a close fit therewith and to automatically take up wear.

In order to accomplish this in the present illustration the valve is shown as having the end slits 15, 16 extending longitudinally from opposite ends thereof by terminating short of the bore 7 and extending entirely across the valve. The valve is also provided with transverse slits 17, 18 extending entirely across the valve and in staggered relation with the slits 15, 16 and extending from the bore 7 outwardly toward the ends of the valve. These slits allow the valve to yield transversely. When the valve is inserted into the seat 4 it should be inserted under compression so that when released it will form a close yielding fit with the seat and as it wears it will gradually expand outwardly to take up the wear. The slits 15, 16, 17 and 18 should be filled with a packing such as lead or asbestos which will not destroy the yielding quality of the valve but which will prevent the accumulation of sand or other solid matter in these slits which would destroy the yieldability of the valve.

The drawing and description are illustrative merely, while the broad principle of the invention will be defined by the appended claims.

What I claim is:

1. A valve assembly comprising a valve casing having a passageway therethrough for fluid and having a bore across the passageway forming a valve seat, a unitary valve on the seat having a bore and turnable to bring its bore into and out of alignment with the passageway, said valve having slits across the valve in staggered relation to render the valve transversely yieldable.

2. A valve assembly comprising a valve casing having a passageway therethrough for fluid and having a bore across the passageway forming a valve seat, a unitary valve on the seat having a bore and turnable to bring its bore into and out of alignment with the passageway, said valve having slits across the valve in staggered relation to render the valve transversely yieldable and packing in the slits.

WALTER L. CHURCH.